Levis H. Davis.

Assignor to Cusho & Co.

Grain & Straw Separator

72374

PATENTED
DEC 17 1867

Witnesses.

Inventor:
L. H. Davis
by his Attys
Baldwin & Sons

United States Patent Office.

LEVIS H. DAVIS, OF NEWARK, DELAWARE, ASSIGNOR TO CASH O & CO.

Letters Patent No. 72,374, dated December 17, 1867.

IMPROVEMENT IN GRAIN AND STRAW-SEPARATORS.

*The Schedule referred to in these Letters Patent and making part of the same.*

TO ALL WHOM IT MAY CONCERN:

Be it known that I, LEVIS H. DAVIS, of Newark, in the county of New Castle, and State of Delaware, have invented a new and useful Improvement in Grain and Straw-Separators, of which the following is a full, clear, and exact description, reference being had to the accompanying drawings, which make part of this specification, and in which—

Figure 1:
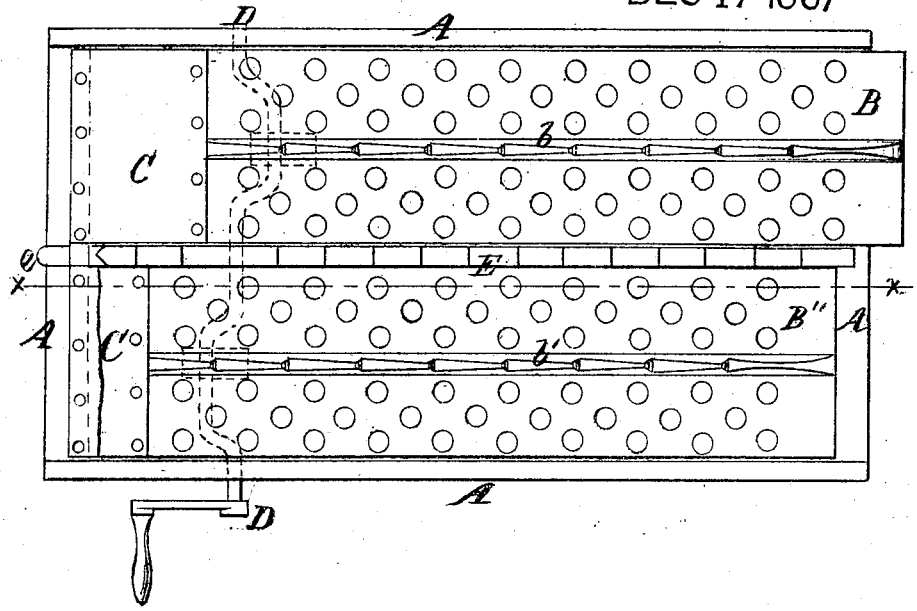

Figure 1 represents a plan view of my improvement, and

Figure 2:
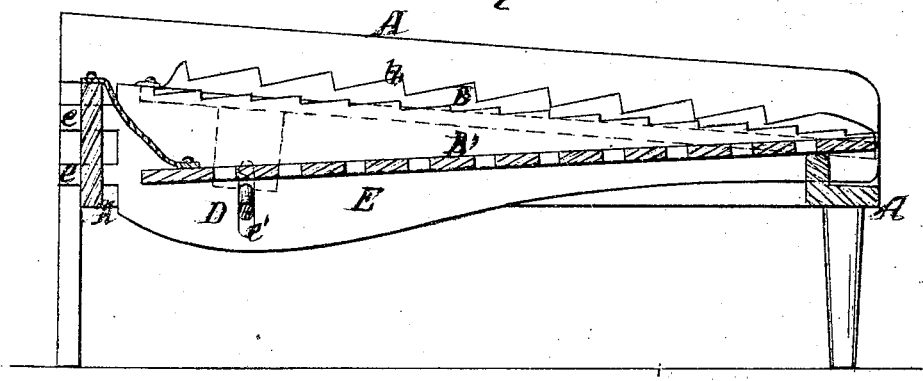

Figure 2 a vertical longitudinal section through the same at the line $x\,x$ of fig. 1.

It is the object of my invention effectually to separate the grain and straw as they pass from the cylinder of a threshing-machine; and to this end the improvement herein claimed consists in a novel mode of combining, in a shaking-shoe, riddles having a longitudinal, reciprocating, undulatory motion, with a notched reciprocating centre-bar, as hereinafter more fully described.

In the accompanying drawings, which show only so much of a separator as is necessary to illustrate my invention, two riddles, B B', are shown as arranged parallel to each other in a suitable frame, A. Each riddle is provided with a notched bar, $b\,b'$, in its centre, and is attached, at the end nearest the threshing-cylinder, to the frame by a flexible apron, C, of canvas or leather. The riddles are attached to cranks D, driven in any suitable manner, which communicate to them a longitudinal, reciprocating, undulatory motion in alternately opposite directions. A notched bar, E, is arranged to reciprocate in a straight line in the frame between the riddles, being held by guides, $e$, playing through the front end piece of the frame. This bar is reciprocated by means of a bend in the crank-shaft D, which works in a vertical slot, $e'$, in the under side of the centre-bar.

The operation is as follows: As the straw and grain are thrown out by the threshing-cylinder, they fall upon the riddles and centre-bar. The teeth of the centre-bar, as well as the riddle-bars $b\,b'$, are ratchet-shaped, with their abrupt ends towards the rear. The straw is intended to be fed in crosswise of the separator. The rotation of the crank D imparts a reciprocating motion, in a straight line, to the centre-bar E, and a reciprocating, undulating motion to the riddles in alternately opposite directions; that is, one riddle is always moving in a direction opposite to the other. The effect of these movements is that the straw is thoroughly agitated, being alternately lifted and lowered at each end, rocking on the centre-bar as a fulcrum, and, at the same time, having a horizontal rocking movement imparted to it by having each end of the straw alternately moved forward by the riddle-ratchets $b\,b'$, and being also shoved backward at each stroke of the reciprocating centre-bar. The grain is rapidly shaken out by these abrupt movements, and falls through the riddle into a suitable receptacle, or may pass on to the winnowing-apparatus, when one is used. The straw falls upon the ground at the rear of the machine.

I have found by experiment that the straw is discharged more rapidly, and the grain is more thoroughly separated, by using the notched reciprocating centre-bar, instead of a fixed partition, as has heretofore been done.

What I claim as my invention, and desire to secure by Letters Patent, is—

The combination, substantially in the manner described, of the screens having a reciprocating, longitudinal, undulating motion, with the interposed centre-bar, having a rectilinear reciprocating movement, for the purpose of thoroughly agitating and rapidly discharging the straw.

I also claim the notched reciprocating centre-bar, arranged and operating as described.

In testimony whereof, I have hereunto subscribed my name.

LEVIS H. DAVIS.

Witnesses:
  BENJ'N CAULK,
  JAMES H. RAYO.